United States Patent
Sürken

(10) Patent No.: US 11,732,617 B2
(45) Date of Patent: Aug. 22, 2023

(54) INSTALLATION COMPRISING AN AUXILIARY MODULE

(71) Applicant: Siemens Energy Global GmbH & Co. KG, Bayern (DE)

(72) Inventor: Norbert Sürken, Mülheim a.d. Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/793,390

(22) PCT Filed: Dec. 28, 2020

(86) PCT No.: PCT/EP2020/087930
§ 371 (c)(1),
(2) Date: Jul. 16, 2022

(87) PCT Pub. No.: WO2021/151605
PCT Pub. Date: Aug. 5, 2021

(65) Prior Publication Data
US 2023/0046791 A1   Feb. 16, 2023

(30) Foreign Application Priority Data
Jan. 29, 2020 (DE) .................. 10 2020 201 029.3

(51) Int. Cl.
*F01K 7/16* (2006.01)
*F22B 1/00* (2006.01)

(52) U.S. Cl.
CPC ................ *F01K 7/16* (2013.01); *F22B 1/003* (2013.01)

(58) Field of Classification Search
CPC .......... F01K 7/16; F22B 1/003; F22B 1/1815; Y02E 60/36; F22D 1/32
(Continued)

(56) References Cited

U.S. PATENT DOCUMENTS 4,498,301 A * 2/1985 Tsubouchi ................ F01K 7/40
60/657
5,526,386 A * 6/1996 Tsiklauri ................ F01K 23/106
60/644.1
(Continued)

FOREIGN PATENT DOCUMENTS

DE    102011121341 A1    6/2013
DE    102012013076 A1    1/2014
(Continued)

OTHER PUBLICATIONS

PCT International Search Report and Written Opinion of International Searching Authority dated Sep. 4, 2021 corresponding to PCT International Application No. PCT/EP2020/087930 filed Dec. 28, 2020.

*Primary Examiner* — Hoang M Nguyen
(74) *Attorney, Agent, or Firm* — Wolter Van Dyke Davis, PLLC

(57) ABSTRACT

An installation with a steam turbine, a steam generator, and also a condenser, the steam generator being connected in terms of flow to an inlet of the steam turbine, and an outlet of the steam turbine being connected to the condenser, with the condenser being connected to the steam generator. A booster is arranged in a steam line that leads into the steam turbine in which an oxyhydrogen reaction takes place, the resulting steam being fed to a steam turbine.

5 Claims, 2 Drawing Sheets

(58) Field of Classification Search
USPC .......................................... 60/653, 677–679
See application file for complete search history.

(56) References Cited

U.S. PATENT DOCUMENTS

| | | | |
|---|---|---|---|
| 5,782,081 A | 7/1998 | Pak et al. | |
| 7,458,219 B2* | 12/2008 | Herzog | F01K 7/16 |
| | | | 60/670 |
| 2019/0390577 A1 | 12/2019 | Tanimura et al. | |
| 2020/0032676 A1* | 1/2020 | Nose | F02C 3/20 |
| 2022/0099021 A1* | 3/2022 | Uechi | C01B 3/04 |

FOREIGN PATENT DOCUMENTS

| | | |
|---|---|---|
| DE | 102015218502 A1 | 3/2017 |
| WO | 2017050459 A1 | 3/2017 |

* cited by examiner

INSTALLATION COMPRISING AN AUXILIARY MODULE

CROSS REFERENCE TO RELATED APPLICATIONS

This application is the US National Stage of International Application No. PCT/EP2020/087930 filed 28 Dec. 2020, and claims the benefit thereof. The International Application claims the benefit of German Application No. DE 10 2020 201 029.3 filed 29 Jan. 2020. All of the applications are incorporated by reference herein in their entirety.

FIELD OF INVENTION

The invention relates to an installation comprising a steam turbine, a steam generator, and also a condenser, the steam generator being connected in terms of flow to an inlet of the steam turbine, and an outlet of the steam turbine being connected to the condenser, with the condenser being connected to the steam generator.

BACKGROUND OF INVENTION

In conventional steam power plants, live steam is generated in the steam generator in a conventional way and fed to a steam turbine, which generally has a high-pressure part-turbine, a medium-pressure part-turbine and a low-pressure part-turbine. The live steam flows into the high-pressure part-turbine and then to a steam generator, where the steam is heated again. The steam then flows into a medium-pressure part-turbine by way of a so-called hot reheater line. After the medium-pressure part-turbine, the steam flows to a low-pressure part-turbine and then to a condenser, where the steam condenses again into water. The water then flows to the steam generator. This completes a closed cycle.

A part-turbine which is exposed to steam from a reheater is referred to as a medium-pressure part-turbine.

A part-turbine which is exposed to live steam from the steam generator is referred to as a high-pressure part-turbine, while live steam should be understood as meaning steam which has the highest temperatures and pressures in the installation and in terms of flow is upstream of a medium-pressure part-turbine.

SUMMARY OF INVENTION

An object of the invention is to improve this cycle.

This object is achieved by an installation as claimed.

The invention is based on the aspect of increasing the energy in the steam that is in the water-steam cycle. This is achieved according to the invention by a booster being arranged in the installation. The booster is designed in such a way that it allows hydrogen and oxygen to react with one another in a controlled manner in an oxyhydrogen reaction, whereby water is produced in the form of steam. This steam is then directed into the steam turbine. The overall efficiency of the installation is thereby increased.

Advantageous developments are specified in the subclaims.

In a first advantageous development, the temperature of the steam that flows into the steam turbine is increased by the booster.

In a further advantageous development, the thermodynamic state of the steam that flows into the steam turbine is increased.

In a further advantageous development, the booster is preheated.

It has been found that the booster can be operated better when it is preheated.

In a further advantageous development, the booster is preheated with steam.

In a further advantageous development, the booster is preheated with steam from the installation, in particular from the steam generator.

In a further advantageous development, the water condensed in the condenser is partially fed to an electrolyzer, the electrolyzer being designed in such a way that this water separates into hydrogen and oxygen.

The hydrogen and oxygen generated in the electrolyzer are advantageously fed to the booster.

In a further advantageous development, the steam turbine comprises a high-pressure part-turbine, a medium-pressure part-turbine and a low-pressure part-turbine, the booster being arranged upstream of the medium-pressure part-turbine.

In a further advantageous development, the booster is connected in terms of flow to the outlet of the high-pressure part-turbine, a mixture of steam from the reheater and from the high-pressure part-turbine being arranged in the booster.

The invention is illustrated below on the basis of various figures for better understanding by showing exemplary embodiments.

The properties, features and advantages of this invention described above and the manner in which they are achieved will become clearer and more clearly understandable in conjunction with the following description of the exemplary embodiments, which are explained in greater detail in conjunction with the drawings.

The same components or components with the same function are in this case identified by the same designations.

Exemplary embodiments of the invention are described below with reference to the drawings. The latter are not intended to represent the exemplary embodiments to scale; rather, the drawing takes a schematized and/or slightly distorted form where useful for explanatory purposes. With regard to additions to the teachings which are directly evident from the drawings, reference is made to the relevant prior art.

DETAILED DESCRIPTION OF INVENTION

In the figures, the same designations denote components that are functionally the same.

Figure 1:
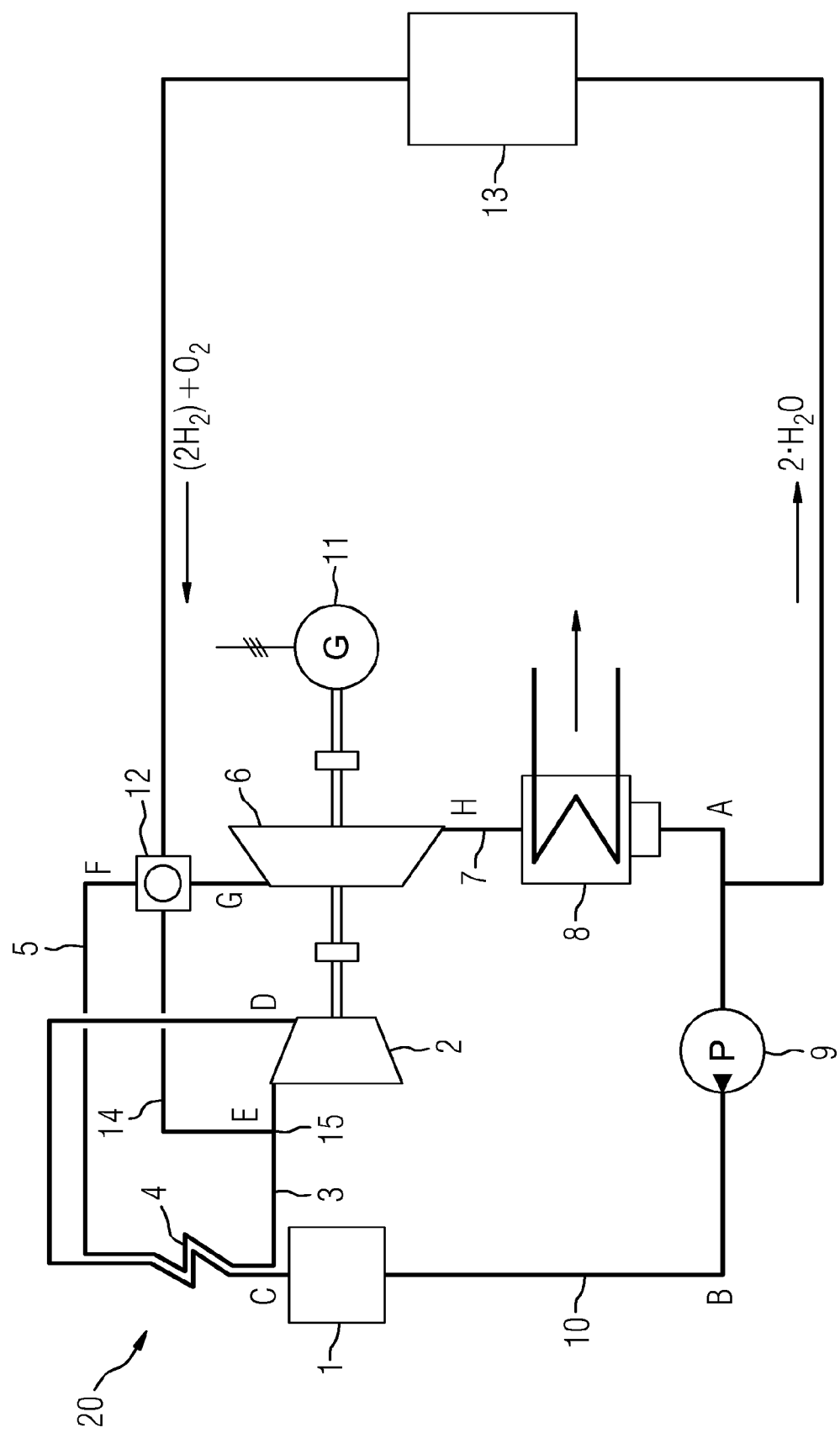
FIG. 1 shows a schematic representation of the installation.

FIG. 1 shows a schematic representation of an installation (20) according to the invention.

In a steam generator (1), water is heated. The water is thereby heated until it is in the form of steam. The high-pressure live steam thereby generated is then fed to a high-pressure part-turbine (2). In the high-pressure part-turbine (2), the energy of the steam is converted into mechanical energy. As this happens, the temperature and pressure of the steam fall. After the high-pressure part-turbine (2), the steam flows by way of a cold reheater line "kZÜ" (3) to a reheater (4). There, the temperature of the steam is increased again. The steam then flows by way of a hot reheater line "hZÜ" (5) into a medium-pressure part-turbine (6). After the medium-pressure part-turbine (6), the steam flows to a low-pressure part-turbine (not shown). The medium-pressure part-turbine (6) shown in FIG. 1 may also represent a combined medium-pressure and low-pressure part-turbine, in which the medium-pressure and low-pressure part-turbines have a common housing.

After the low-pressure part-turbine, the steam flows by way of a line (7) into a condenser (8), where it condenses again into water. The water thereby produced is passed by means of a pump (9) again by way of a line (10) to the steam generator (1).

A generator (11) is connected in a torque-transmitting manner to the steam turbine, with the steam turbine being understood as meaning the entirety of the high-pressure part-turbine, medium-pressure part turbine and low-pressure part turbine.

According to the invention, a booster (12) is arranged in the hot reheater line "hZÜ" (5). The booster (12) is designed in such a way that it can allow hydrogen and oxygen to react with one another in an oxyhydrogen reaction. After the reaction, water is produced in a vaporous phase.

This additional energy is as it were passed into the medium-pressure part-turbine (6). What is important here is that the mass flow of the steam is not necessarily increased by the booster (12), but rather the energy of the steam. Therefore, steam from the steam generator (1) mixed with steam produced by the booster (12) flows into the medium-pressure part-turbine (6).

The booster (12) is preheated before operation begins. It has been found that a stable reaction is produced if the booster (12) is preheated.

This preheating is performed with a device that is not shown.

In an alternative embodiment, the preheating may be performed with steam. Steam is taken here from the cold reheater line "kZÜ" (3) or from the hot reheater line "hZÜ" (5).

After the condensation of the steam in the condenser (8), part of the water is fed to an electrolyzer (13). The electrolyzer (13) is designed in such a way that it separates the water into hydrogen and oxygen. This takes place by adding energy.

The hydrogen and oxygen generated in the electrolyzer (13) are fed to the booster (12), which is symbolically shown at the top right in FIG. 1. This completes a closed cycle.

In addition to the steam from the hot reheater line "hZÜ" (5), steam is taken from the cold reheater line "kZÜ" (3) and passed to the booster (12) by way of a line (14). This line (14) is connected in terms of flow to the cold reheater line "kZÜ" (3) at a branch (15).

Figure 2:
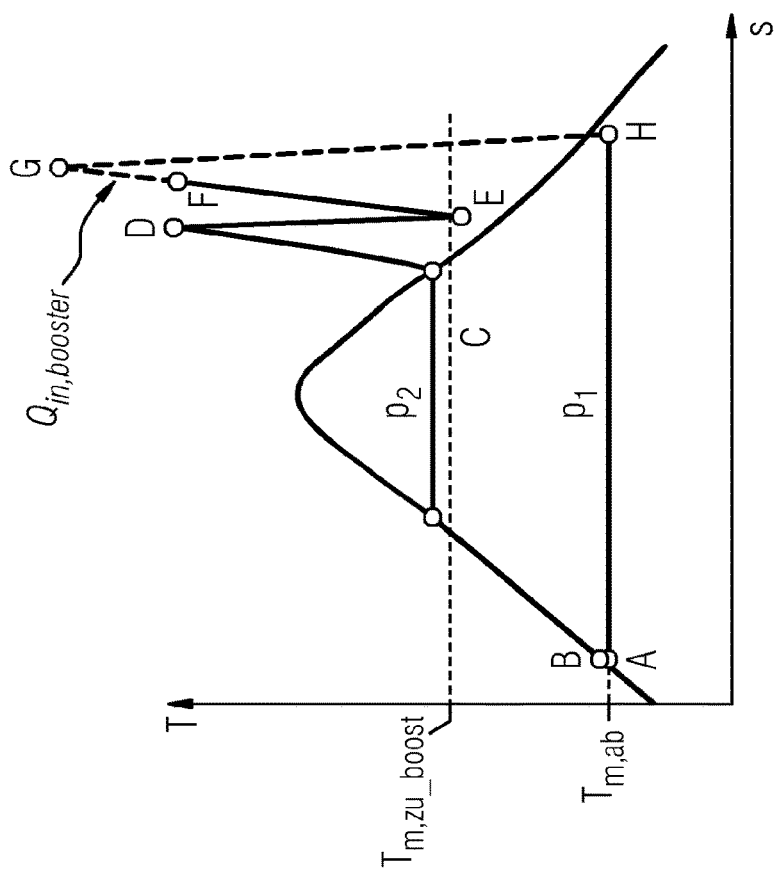
FIG. 2 shows a representation of a T-S diagram of an installation according to the prior art.

FIG. 2 shows a known T-S diagram for a water-steam cycle in a steam power plant according to the prior art. The letters shown in FIG. 2 correspond to the positions shown in FIG. 1, but without a booster (12). The following apply: A . . . downstream of the condenser (8), B . . . downstream of the pump (9), C . . . downstream of the steam generator (1), D . . . inlet of the high-pressure part-turbine (2), E . . . outlet of the high-pressure part-turbine (2), F . . . downstream of the reheater (4) upstream of the medium-pressure part-turbine (6), H . . . downstream of the medium-pressure part-turbine (6).

Figure 3:
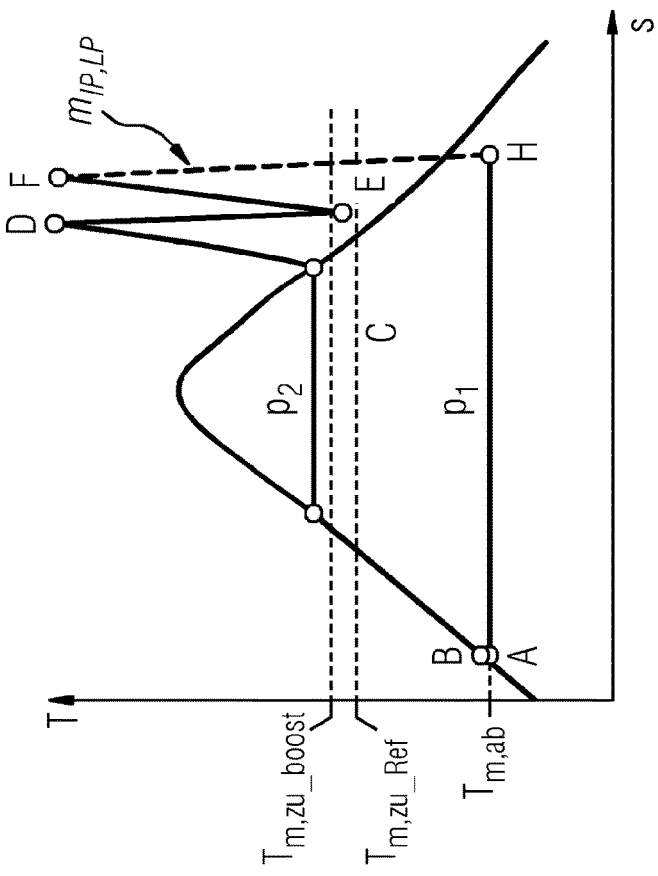
FIG. 3 shows a representation of a T-S diagram of an installation according to the invention.

FIG. 3 shows the T-S diagram of an installation according to the invention. The letters shown in FIG. 3 correspond to the positions shown in FIG. 1. Now with the booster (12). The following applies: G . . . downstream of the booster (12).

An essential feature of FIG. 3 is that the steam state of the steam changes due to the booster (from F to G). As can be seen from the figure, the mass flow is not increased, but instead the steam parameters, such as the temperature, are increased, as can be seen by the rise from F to G in FIG. 3.

Although the invention has been more specifically illustrated and described in detail by the exemplary embodiment, the invention is not restricted by the disclosed examples. And other variations can be derived herefrom by a person skilled in the art without departing from the scope of protection of the invention.

The invention claimed is:

1. An installation, comprising:
a steam turbine, a steam generator, a condenser, and a booster,
wherein the steam generator is connected in terms of flow to an inlet of the steam turbine, and an outlet of the steam turbine is connected to the condenser, with the condenser connected to the steam generator,
wherein the steam turbine comprises a high-pressure part-turbine and a medium-pressure part-turbine, wherein the outlet of the high-pressure part-turbine is connected in terms of flow to a reheater by way of a cold reheater line "kZÜ", wherein the inlet of the medium-pressure part-turbine is connected in terms of flow to the reheater by way of a hot reheater line "hZÜ",
wherein the booster is arranged in a steam line that leads into the steam turbine and is designed in such a way that an oxyhydrogen reaction takes place in the booster, with a reaction product that is produced after the oxyhydrogen reaction being passed into the steam turbine,
wherein the booster comprises a device for preheating the booster, wherein the preheating is performed by steam, wherein the steam for the preheating is taken from the cold reheater line "kZÜ" or from the hot reheater line "hZÜ",
wherein the booster is connected in terms of flow to the outlet of the high-pressure part-turbine, with a mixture of steam from the reheater and steam from the high-pressure part-turbine arranged in the booster.

2. The installation as claimed in claim 1,
wherein a temperature of the steam that flows into the steam turbine is increased in the booster.

3. The installation as claimed in claim 1,
wherein a state of the steam that flows into the steam turbine is increased in the booster.

4. The installation as claimed in claim 1,
wherein steam is condensed into water in the condenser and the water is fed to an electrolyzer,
wherein the electrolyzer is designed in such a way that the water is separated into hydrogen and oxygen.

5. The installation as claimed in claim 4,
wherein the hydrogen and the oxygen are fed to the booster.

* * * * *